United States Patent
Qian et al.

(10) Patent No.: US 10,120,457 B2
(45) Date of Patent: Nov. 6, 2018

(54) DISPLAYING A LOGOGRAM INDICATION

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 377 days.

(21) Appl. No.: 14/924,371

(22) Filed: Oct. 27, 2015

(65) Prior Publication Data

US 2017/0115744 A1 Apr. 27, 2017

(51) Int. Cl.
- *G06F 3/048* (2013.01)
- *G06F 3/01* (2006.01)
- *G06F 3/023* (2006.01)
- *G06F 3/0488* (2013.01)

(52) U.S. Cl.
CPC ............ *G06F 3/018* (2013.01); *G06F 3/0236* (2013.01); *G06F 3/04883* (2013.01)

(58) Field of Classification Search
CPC ............... G06F 17/2223; G06F 3/0237; G06F 3/04883; G06F 3/04842; G06F 3/018; G06F 3/0482; G06K 9/00402; G06K 9/00436; G06K 2209/011

See application file for complete search history.

(56) References Cited

U.S. PATENT DOCUMENTS

| | | | | |
|---|---|---|---|---|
| 5,187,480 A | * | 2/1993 | Thomas | G06F 3/018 341/22 |
| 7,505,911 B2 | * | 3/2009 | Roth | G10L 15/22 379/88.03 |
| 2003/0123745 A1 | * | 7/2003 | Bryborn | G06F 3/017 382/242 |
| 2017/0068868 A1 | * | 3/2017 | Carbune | G06K 9/222 |

* cited by examiner

Primary Examiner — Jeffrey A Gaffin
Assistant Examiner — Ayesha Huertas Torres
(74) Attorney, Agent, or Firm — Kunzler, PC

(57) ABSTRACT

For displaying a logogram indication, a processor identifies a logogram input received from an input device. The logogram input is selected from the group consisting of a context logogram and a sub-logogram. The processor further displays a logogram indication selected from the group consisting of a selected logogram and a logogram hint list of candidate logograms in response to identifying the logogram input.

15 Claims, 11 Drawing Sheets

220

| | Proceeding Logograms 225 | Sub-Logogram ID 210 | Logogram ID 260 | Logogram Probability 230 | ... | Logogram ID 260 | Logogram Probability 230 |
|---|---|---|---|---|---|---|---|
| 223 | Proceeding Logograms 225 | Sub-Logogram ID 210 | Logogram ID 260 | Logogram Probability 230 | ... | Logogram ID 260 | Logogram Probability 230 |
| 223 | Proceeding Logograms 225 | Sub-Logogram ID 210 | Logogram ID 260 | Logogram Probability 230 | | Logogram ID 260 | Logogram Probability 230 |

| Logogram Data 255 |
| Logogram Data 255 |
| Logogram Data 255 |
| Logogram Data 255 |

255

| Logogram ID 260 |
| Logogram Strokes 265 |
| Similar Logograms 270 |

DISPLAYING A LOGOGRAM INDICATION

FIELD

The subject matter disclosed herein relates to logogram indications and more particularly relates to displaying a logogram indication.

BACKGROUND

Description of the Related Art

Logograms often include many strokes, and can be associated with many other logograms and phrases, increasing the complexity of entering logograms into an input device.

BRIEF SUMMARY

An apparatus for displaying a logogram indication is disclosed. The apparatus includes an input device, a processor in electrical communication with the input device, and a memory that stores code executable by the processor. The processor identifies a logogram input received from the input device. The logogram input is selected from the group consisting of a context logogram and a sub-logogram. The processor further displays a logogram indication selected from the group consisting of a selected logogram and a logogram hint list of candidate logograms in response to identifying the logogram input. A method and a computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating one embodiment of a context history;

DETAILED DESCRIPTION

Figure 1:
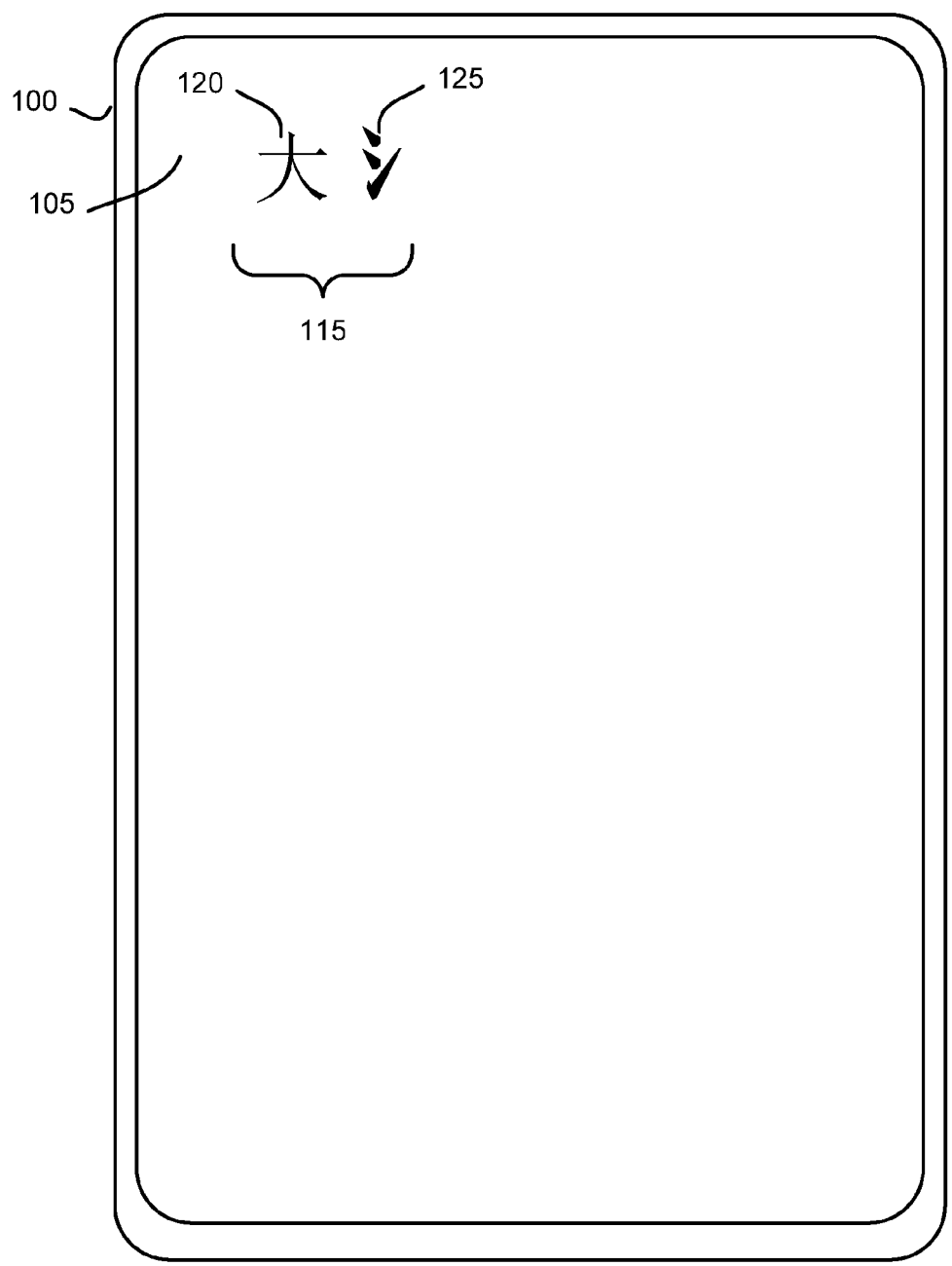
FIG. 1 is a schematic block diagram illustrating one embodiment of an input device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an input device 105. The input device 105 may be embodied in a computer such as a tablet computer 100 as shown. In the depicted embodiment, the input device 105 is a touch screen. Alternatively, the input device 105 may be a keyboard, a mouse, or the like.

The input device 105 may receive a logogram input 115. The logogram input 115 may include a plurality of logogram strokes that form a logogram, a context logogram, a logogram radical, a component logogram, a sub-logogram, or the like. In the depicted embodiment, the logogram input 115 includes a context logogram 120 and the sub-logogram 125. The context logogram 120 may be entered by a user before a desired logogram. The sub-logogram 125 may be a portion of the desired logogram. The component logogram may a logogram that forms a portion of another logogram.

Because each logogram may comprise a plurality of strokes and because a user may not be familiar with all of the strokes necessary to render logogram, entering a logogram into the input device 105 is often difficult. The embodiments described herein identify the logogram input 115 and display a logogram indication in response to identifying the logogram input 115. The logogram indication may be selected from the group consisting of a selected logogram and a logogram hit list of candidate logograms. A user may employ the logogram indication to enter the desired logogram into the input device 105. For example, the logogram indication may be a selected logogram that is automatically displayed. Alternatively, the logogram indication may be a logogram hint list from which the user may select the desired logogram. As a result, the user may enter logograms more rapidly. In addition, the user may enter the logograms for which the user is unfamiliar with all of the required strokes.

Figure 2A:
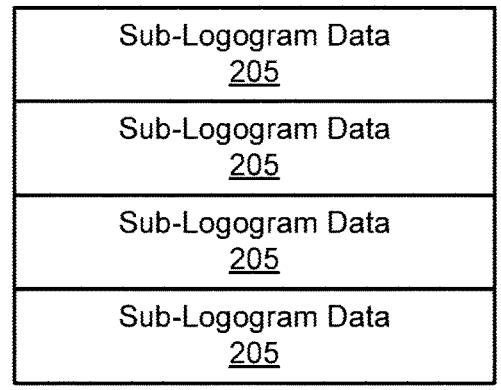
FIG. 2A is a schematic block diagram illustrating one embodiment of a sub-logogram database.

FIG. 2A is a schematic block diagram illustrating one embodiment of a sub-logogram database 200. The sub-logogram database 200 maybe organized as a data structure in a memory. The logogram database 200 includes a plurality of sub-logogram data 205.

Figure 2B:
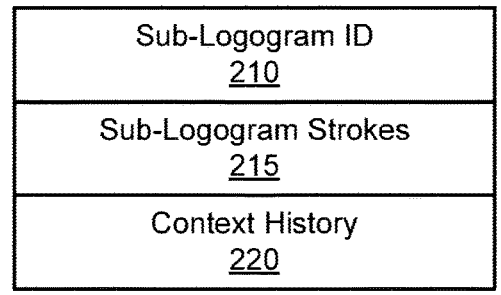
FIG. 2B is a schematic block diagram illustrating one embodiment of sub-logogram data.

FIG. 2B is a schematic block diagram illustrating one embodiment of the sub-logogram data 205. The sub-logogram data 205 maybe organized as a data structure in a memory. The sub-logogram data 205 may describe a sub-logogram. The sub-logogram may be selected from the group consisting of a logogram radical and a component logogram. The logogram radical may be a character radical such as the 人 in 任. A component logogram may be a logogram that is embodied as a portion of another logogram such as the 上 in 望. In the depicted embodiment, the sub-logogram data 205 includes a sub-logogram identifier 210, sub-logogram strokes 215, and a context history 220.

The sub-logogram identifier 210 may uniquely identify a sub-logogram that corresponds to the sub-logogram data 205. In one embodiment, the sub-logogram identifier 210 is a CJK Unicode value.

The sub-logogram strokes 215 may describe the strokes in the sub-logogram. The context history 220 may describe one or more contexts in which the sub-logogram is used. The context history 220 is described in more detail in FIG. 2C.

FIG. 2C is a schematic block diagram illustrating one embodiment of the context database 220. The context database 220 maybe organized as a data structure in a memory. The context database 220 includes a plurality of entries 223. For simplicity two entries 223 are shown. Each entry 223 includes proceeding logograms 225, a sub-logogram identifier 210, one or more candidate logogram identifiers 260, and one or more corresponding logogram probabilities 230 for each logogram identifier 260.

The proceeding logograms 225 may specify one or more context logograms 120 that precede the sub-logogram 125 corresponding to the sub-logogram identifier 210. The proceeding logograms 225 may include one or more logograms in a specified order. In one embodiment, the proceeding logograms 225 comprise an ordered list of logogram identifiers 260.

Each entry 233 includes the plurality of logogram identifiers 260 and corresponding logogram probabilities 230. The logogram identifier 260 may identify a candidate logogram that may appear in a phrase after the proceeding logograms 225 and the sub-logogram 125 associated with the sub-logogram identifier 210. The logogram probability 230 may specify a likelihood that the candidate logogram associated with the logogram identifier 260 will be desired by the user has entered the proceeding logograms 225 and the sub-logogram 125.

Figure 2D:
FIG. 2D is a schematic block diagram illustrating one embodiment of a logogram database.

FIG. 2D is a schematic block diagram illustrating one embodiment of a logogram database 250. The logogram database 250 may be organized a data structure in a memory. In the depicted embodiment, the logogram database 250 includes logogram data 255 for a plurality of logograms.

Figure 2E:
FIG. 2E is a schematic block diagram illustrating one embodiment of logogram data.

FIG. 2E is a schematic block diagram illustrating one embodiment of the logogram data 255. The logogram data 255 maybe organized as a data structure in a memory. In the depicted embodiment, the logogram data 255 includes the logogram identifier 260 for the logogram associated with the logogram data 255, logogram strokes 265, and similar logograms 270. The logogram identifier 260 uniquely identifies the logogram and may be a CJK Unicode value. The logogram strokes 265 may describe the strokes of the logogram. The similar logograms 270 may include the logogram identifiers 260 of logograms that are similar in appearance to the logogram.

Figure 3A:
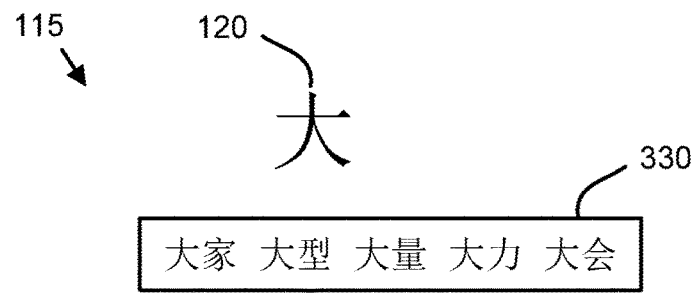
FIGS. 3A-C are drawings illustrating one embodiment of a logogram indication.
Figure 3B:
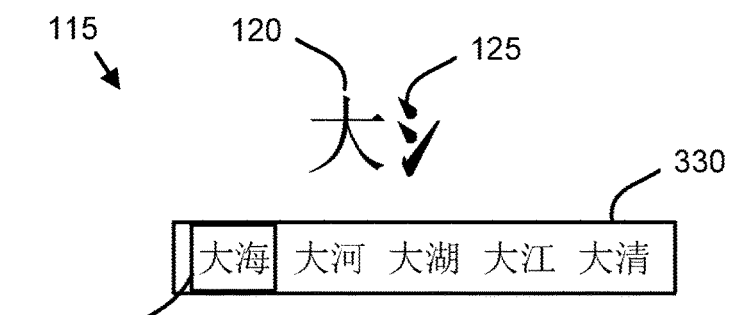
Figure 3C:

FIGS. 3A-C are drawings illustrating one embodiment of a logogram indication for a logogram input 115. In FIG. 3A, the logogram input 115 includes a context logogram 120. In response to the context logogram 120, a logogram hint list 330 of candidate logograms is displayed. The logogram hint list 330 may be the logogram indication. In the depicted embodiment, the logogram hint list 330 displays the context logogram 120 preceding each candidate logogram. Alternatively, the logogram hint list 330 may only display the candidate logograms.

In FIG. 3B, the logogram input 315 includes the context logogram 120 and the sub-logogram 125. In response to the context logogram 120 and the sub-logogram logogram 125 the logogram hint list 330 is displayed with candidate logograms. Each of the candidate logograms includes the sub-logogram 125. In the depicted embodiment, the logogram hint list 330 displays the context logogram 120 preceding each candidate logogram. Alternatively, the logogram hint list 330 may only display the candidate logograms. The user may make a candidate logogram selection 335. For example, the user may tap on the candidate logogram selection 335. In FIG. 3C, the candidate logogram selection 335 is displayed as the selected logogram 305.

Figure 4A:
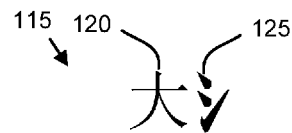
FIGS. 4A-F are drawings illustrating one alternate embodiment of a logogram indication.

FIGS. 4A-F are drawings illustrating one alternate embodiment of a logogram indication for a logogram input 115. In FIG. 4A, the logogram input 115 includes the context logogram 120 and the sub-logogram 125. In response to the combination of the context logogram 120 and the sub-logogram 125, the selected logogram 305 may be retrieved using the context history 220. The selected logogram 305 may satisfy a selection policy based on the sub-logogram 125.

In one embodiment, the selection policy selects most likely selected logogram 305 based on the sub-logogram 125. In addition, the selection policy may select the selected logogram 305 based on the context logogram 120 and the sub-logogram 125. In a certain embodiment, the selection policy may select the selected logogram 305 based on one or more proceeding logograms 225, the sub-logogram 125, and the logogram probability 230.

Figure 4B:
Figure 4C:
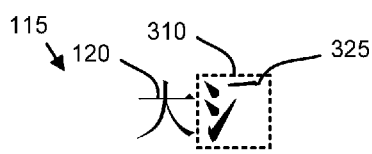
Figure 4D:
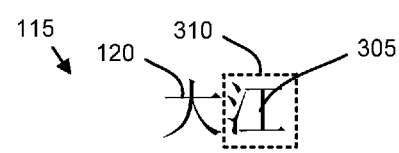

In one embodiment, a logogram input area 310 is defined as shown in FIG. 4B. The selected logogram 305 may be within the logogram input area 310. The user writing within the logogram input area 310 may be interpreted as a logogram rejection of the selected logogram 305. FIG. 4C shows a correction sub-logogram 325 entered with in the logogram input area 310. In response to the correction sub-logogram 325, an alternate selected logogram 305 may be displayed as shown in FIG. 4D. The alternate selected logogram 305 may satisfy the selection policy and may be based on the correction sub-logogram 325.

In one embodiment, if the user does not write with the logogram input area 310, the selected logogram 305 and/or the alternate selected logogram 305 may be retained and displayed. In addition, the selected logogram 305 and/or the alternate selected logogram 305 may be recorded, stored, and/or manipulated.

Figure 4E:
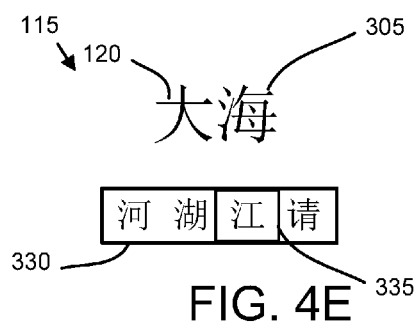
Figure 4F:

FIG. 4E shows a logogram hint list 330 displayed in response to the selected logogram 305. The hint list 330 includes one or more candidate logograms. Each candidate logogram may include the sub-logogram 125. If the user did not intend to enter the selected logogram 305, the user may make a candidate logogram selection 335 from the logogram hint list 330. As shown in FIG. 4F, the candidate logogram selection 335 may be displayed. In addition, the candidate logogram selection 335 may be retained.

Figure 5A:
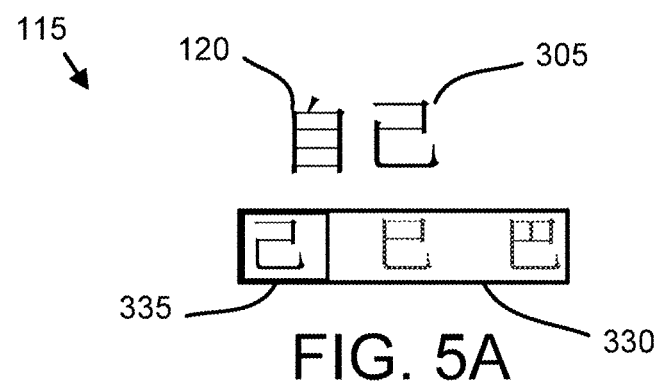
FIGS. 5A-B are drawings illustrating one alternate embodiment of a logogram indication.
Figure 5B:
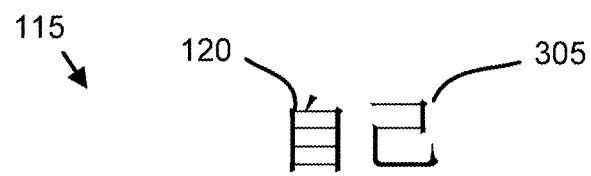

FIGS. 5A-B are drawings illustrating one alternate embodiment of a logogram indication for a logogram input 115. In the depicted embodiment, the selected logogram 305 is displayed in response to a logogram input 115. In addition, the logogram hint list 330 is displayed. The candidate logograms of the logogram hint list 330 include similar logograms 270 that are visually similar to the selected logogram 305. As used herein, visually similar logograms may have one or more of a similar overall appearance, a preponderance of identical strokes, similar component logograms, some identical logograms, and a similar layout. Visually similar logograms have at least one different stroke. The user may make a candidate logogram selection 335 from the logogram hint list 330 and the candidate logogram selection 335 may be displayed as the selected logogram 305 as shown in FIG. 5B.

Figure 6:
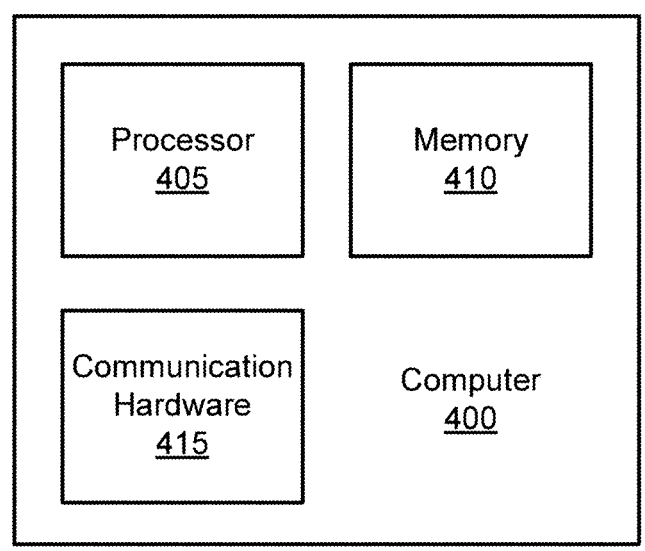
FIG. 6 is a schematic block diagram illustrating one embodiment of a computer.

FIG. 6 is a schematic block diagram illustrating one embodiment of a computer 400. The computer 400 may be embodied in the tablet computer 100. In the depicted embodiment, the computer 400 includes a processor 405, a memory 410, and communication hardware 415. The memory 410 may be a semiconductor storage device, a hard disk drive, a micromechanical storage device, an optical storage device, or the like. The memory 410 may store code. The processor 405 may execute the code. The communication hardware 415 may communicate with other devices.

Figure 7A:
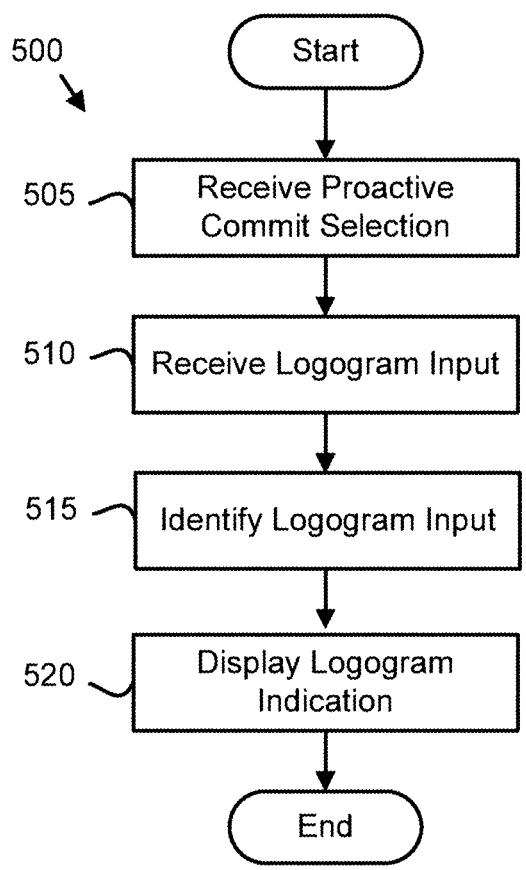
FIG. 7A is a schematic flow chart diagram illustrating one embodiment of a logogram indication method.

FIG. 7A is a schematic flow chart diagram illustrating one embodiment of a logogram indication method 500. The method 500 may display a logogram indication in response to identifying a logogram input 115. The method 500 may be performed by the processor 405. Alternatively, the method 500 may be performed by a computer readable storage medium such as the memory 410. The computer readable storage medium may store code that is executed by the processor 405 to perform the method 500.

The method 500 starts, and in one embodiment, the computer 400 receives 505 a proactive commit selection. The proactive commit selection may indicate that the computer 400 is to automatically display a selected logogram 305 that satisfies the selection policy based on the sub-logogram 125 of the logogram input 115.

The computer 400 may receive 510 the logogram input 115. In one embodiment, the logogram input 115 is entered with a finger and/or a stylus on a touch screen input device 105. The logogram input 115 may be selected from the group consisting of a context logogram 120 and the sub-logogram 125.

The computer 400 may further identify 515 the logogram input 115. In one embodiment, the logogram strokes 265 are compared with the context logogram 120 to identify 515 the context logogram 120. In addition, the sub-logogram strokes 215 may be compared with the sub-logogram 125 to identify 515 the sub-logogram 125.

The computer 400 may further display 520 the logogram indication in response to identifying the logogram input 115 and the method 500 ends. The logogram indication may be selected from the group consisting of a selected logogram 305 and a logogram hint list 330 of candidate logograms.

The computer 400 may automatically display 520 the selected logogram 305 as shown in FIG. 4B. In one embodiment, the computer 400 automatically displays 520 the selected logogram 305 if the proactive commit selection was received.

The selected logogram 305 may satisfy a selection policy. The logogram with the highest logogram probability 230 may satisfy the selection policy. Alternatively, the logogram with the highest logogram probability 230 and the sub-logogram 125 may satisfy the selection policy. In a certain embodiment, the logogram with the highest logogram probability 230, the sub-logogram 125, and that is preceded by one or more context logograms 120 that are equivalent to the preceding logograms 225 may satisfy the selection policy. In one embodiment, the selection policy is based on the sub-logogram 125.

Alternatively, the computer 400 may display the logogram hint list 330 and allow the user may make a candidate logogram selection 335 from the logogram hint list 330. The candidate logogram selection 335 may be displayed 520 as the selected logogram 305 is shown in FIGS. 3B-C.

Figure 7B:
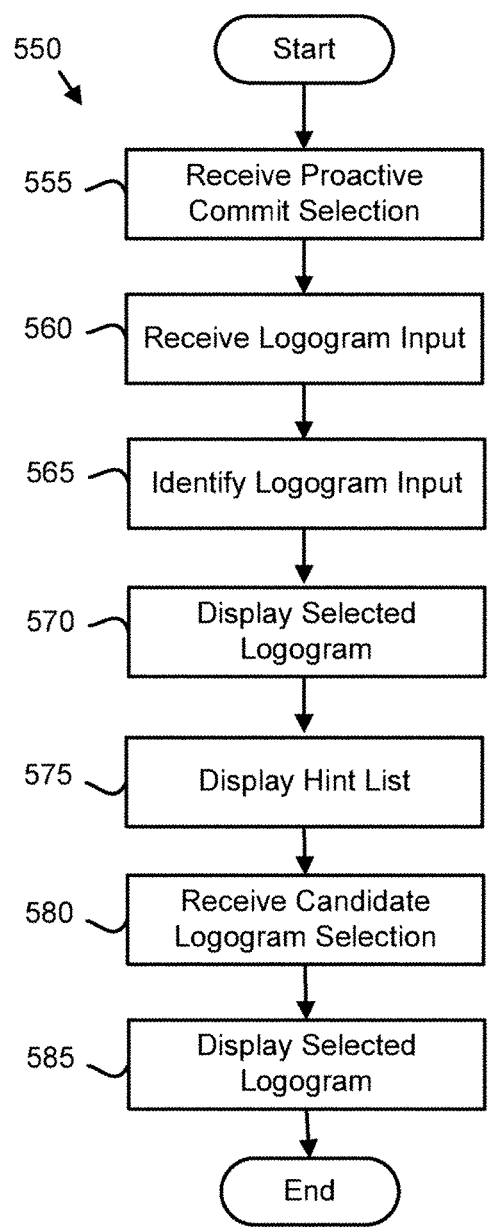
FIG. 7B is a schematic flow chart diagram illustrating one embodiment of a logogram hint list indication method.

FIG. 7B is a schematic flow chart diagram illustrating one embodiment of a logogram hint list indication method. The method 550 may display a logogram indication in response to identifying a logogram input 115. The method 550 may be performed by the processor 405. Alternatively, the method 550 may be performed by a computer readable storage medium such as the memory 410. The computer readable storage medium may store code that is executed by the processor 405 to perform the method 550.

The method 550 starts, and in one embodiment, the computer 400 receives 555 the proactive commit selection. The proactive commit selection may indicate that the computer 400 is to automatically display a selected logogram 305 that satisfies the selection policy based on the sub-logogram 125.

The computer 400 may receive 560 a logogram input 115. The logogram input 115 may be a sub-logogram 125. Alternatively, the logogram input 115 may be a combination of the context logogram 120 and the sub-logogram 125. In a certain embodiment, the logogram input 115 is a logogram associated with similar logograms 270.

The computer 400 may further identify 565 the logogram input 115. In one embodiment, the logogram strokes 265 are compared with the context logogram 120 to identify 565 the context logogram 120. In addition, the sub-logogram strokes 215 may be compared with the sub-logogram 125 to identify 565 the sub-logogram 125.

In one embodiment, the computer 400 automatically displays 570 an identified logogram from the logogram input 115 as the selected logogram 305. In one embodiment, the computer 400 automatically displays 570 the selected logogram 305 if the proactive commit selection was received.

The selected logogram 305 may satisfy the selection policy. The logogram with the highest logogram probability 230 may satisfy the selection policy. Alternatively, the logogram with the highest logogram probability 230 and the sub- logogram 125 may satisfy the selection policy. In a certain embodiment, the logogram with the highest logogram probability 230, the sub-logogram 125, and that is preceded by one or more context logograms 120 that are equivalent to the preceding logograms 225 may satisfy the selection policy.

In addition, the computer 400 may display 575 a logogram hint list 330 comprising candidate logograms. Each candidate logogram of the logogram hint list 330 may include the sub-logogram 125. Alternatively, each candidate logogram of the logogram hint list 330 may be visually similar to the selected logogram 305 as shown in FIG. 5A.

The computer 400 may receive 580 a candidate logogram selection 335 from the logogram hint list 330. In addition, the computer 400 may display 585 the candidate logogram selection 335 as the selected logogram 305 as shown in FIGS. 3C and 5B and the method 550 ends.

Figure 7C:
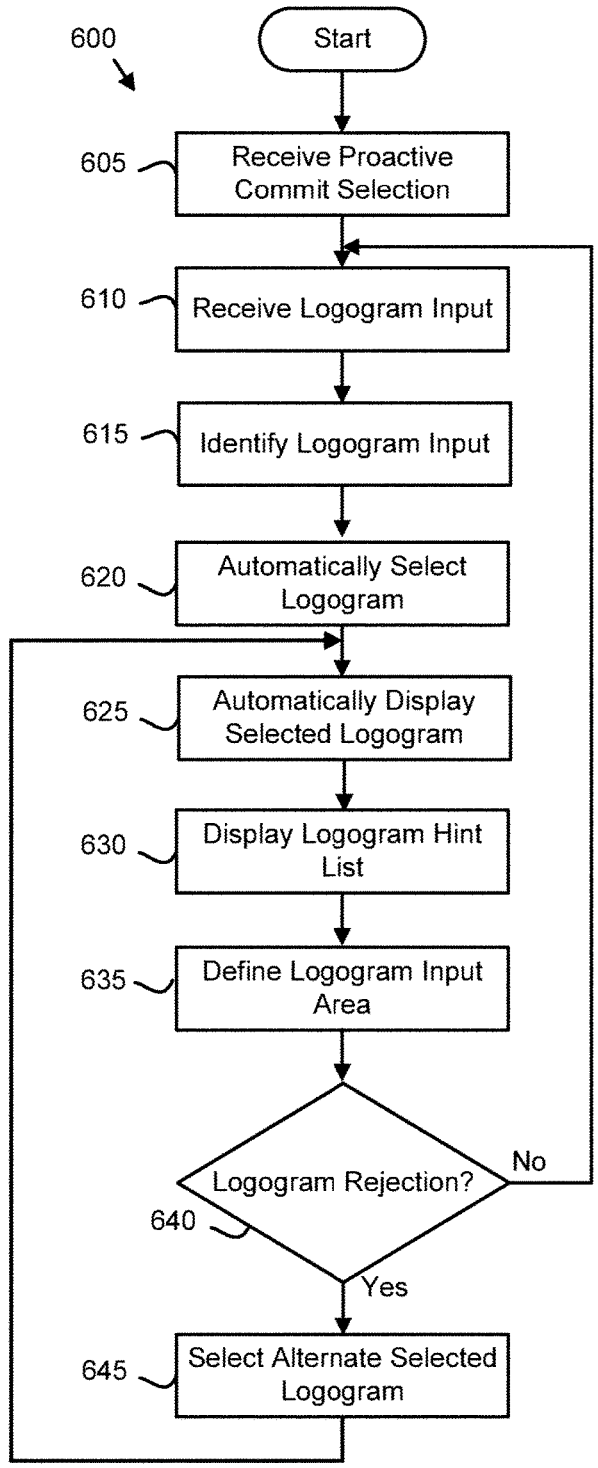
FIG. 7C is a schematic flowchart diagram illustrating one embodiment of a selected logogram automatic display method.

FIG. 7C is a schematic flowchart diagram illustrating one embodiment of a selected logogram automatic display method 600. The method 600 may display a logogram indication in response to identifying a logogram input 115. The method 600 may be performed by the processor 405. Alternatively, the method 600 may be performed by a computer readable storage medium such as the memory 410. The computer readable storage medium may store code that is executed by the processor 405 to perform the method 600.

The method 600 starts, and in one embodiment, the computer 400 receives 605 the proactive commit selection. The proactive commit selection may indicate that the computer 400 is to automatically display a selected logogram 305 that satisfies the selection policy based on the sub-logogram 125.

The computer 400 may receive 610 a logogram input 115. In one embodiment, the logogram input 115 is entered with a finger and/or a stylus on a touch screen input device 105. The logogram input 115 may be selected from the group consisting of a context logogram 120 and the sub-logogram 125.

The computer 400 may further identify 615 the logogram input 115. In one embodiment, the logogram strokes 265 are compared with the context logogram 120 to identify 615 the context logogram 120. In addition, the sub-logogram strokes 215 may be compared with the sub-logogram 125 to identify 615 the sub-logogram 125.

The computer 400 may automatically select 620 the selected logogram 305. The selected logogram 305 may satisfy the selection policy. In one embodiment, the selected logogram 305 is selected using the context history 220. An entry 223 in the context history 220 may be found that has proceeding logograms 225 corresponding to the context logogram 120 and the sub-logogram identifier 210 that corresponds to the sub-logogram 125. In addition, the computer 400 may select the logogram identifier 260 from the entry 223 with the highest logogram probability 230.

The computer 400 may automatically display 625 the selected logogram 305 as shown in FIG. 4B. In one embodiment, the computer 400 automatically displays 615 the selected logogram 305 if the proactive commit selection was received. In a certain embodiment, unless the user indicates a logogram rejection, the selected logogram 305 will be displayed and retained by the computer 400.

In one embodiment, the computer 400 display 630 a logogram hint list 330 as shown in FIGS. 3B, 4E and 5A. The logogram hint list 330 may include one or more candidate logograms.

The computer 400 may define 635 the logogram input area 310 on the input device 105 as shown in FIGS. 4B and 4D. The selected logogram 305 may be within the logogram input area 310.

The computer 400 may determine 640 if a logogram rejection is received. In one embodiment, the logogram rejection comprises a candidate logogram selection 335 from one or more candidate logograms. The one or more candidate logograms may be in the logogram hint list 330. Alternatively, there is no logogram rejection if there is no candidate logogram selection 335. In one embodiment, the selected logogram 305 is automatically retained in response to no logogram rejection and/or no candidate logogram selection 335.

Alternatively, the logogram rejection may comprise an input such as a correction sub-logogram 325 within the logogram input area 310 as illustrated in FIG. 4C. There may be no logogram rejection and the selected logogram 305 may be retained in response to input outside the logogram input area 310. Alternatively, there may be no logogram rejection and the selected logogram 305 may be retained in response to no input within the logogram input area 310.

If there is no logogram rejection, the computer 400 may receive 610 another logogram input 115. If the computer 400 determines 640 there is a logogram rejection, the computer 400 selects 645 an alternate selected logogram 305. The alternate selected logogram 305 may be a candidate logogram selection 335 from the logogram hint list 330 as shown in FIGS. 4E-F. Alternatively, the alternate selected logogram 305 may be selected in response to the correction sub-logogram 325 entered within the logogram input area 310 as shown in FIGS. 4C-D. The computer 400 may further automatically display 625 the alternate selected logogram 305.

The embodiments identify the logogram input 115 and display a logogram indication in response to identifying the logogram input 115. In one embodiment, the logogram input 115 is a context logogram 120 and a selected logogram 305 is automatically displayed in response to the context logogram 120. In an alternative embodiment, the logogram input 115 is the context logogram 120 and the logogram indication is a logogram hint list 335 of candidate logograms is displayed in response to the logogram input 115. In a certain embodiment, the logogram input 115 is the context logogram 120 and the sub-logogram 125 and the logogram hint list 335 is displayed in response to the context logogram 120 and the sub-logogram 125.

In one embodiment, the logogram input 115 is a sub-logogram 125 such as a logogram radical and/or a component logogram. The logogram hint list 335 may be displayed in response to the sub-logogram 125. Alternatively, the logogram input 115 may be the context logogram 120 and the sub-logogram 125. The embodiments may automatically display the selected logogram 305 in response to the context logogram 120 and the sub-logogram 125. The logogram indication simplifies the entry of logograms. As a result, the entry of logograms into the input device 105 is more rapid and less prone to mistakes.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an input device;
   a processor in electrical communication with the input device;
   a memory that stores code executable by the processor to:
   identify a logogram input received from the input device, wherein the logogram input is a sub-logogram that is one of a logogram radical and a component logogram
   display a logogram hint list of candidate logograms, wherein each candidate logogram of the logogram hint list comprises the sub-logogram in response to identifying the logogram input; and
   display a candidate logogram selection from the logogram hint list as a selected logogram.

2. The apparatus of claim 1, wherein the memory further comprises code executable by the processor to display the selected logogram and a correction logogram hint list, each candidate logogram of the correction logogram hint list is visually similar to the selected logogram, and the memory further comprises code executable by the processor to display a candidate logogram selection from the correction logogram hint list as a corrected selected logogram.

3. The apparatus of claim 1, wherein the memory further comprises code executable by the processor to:
   automatically display the selected logogram in response to no candidate logogram selection, wherein the selected logogram satisfies a selection policy based on the sub-logogram; and
   select an alternate selected logogram that satisfies the selection policy in response to a logogram rejection of a first selected logogram.

4. The apparatus of claim 3, wherein the memory further comprises code executable by the processor to define a logogram input area, wherein the selected logogram is within the logogram input area and the logogram rejection comprises input within the logogram input area.

5. The apparatus of claim 4, wherein the selected logogram is retained in response to input outside the logogram input area.

6. A method comprising:
   identifying, by use of a processor, a logogram input received from the input device, wherein the logogram input is a sub-logogram that is one of a logogram radical and a component logogram; and
   displaying and a logogram hint list of candidate logograms, wherein each candidate logogram of the logogram hint list comprises the sub-logogram in response to identifying the logogram input; and
   displaying a candidate logogram selection from the logogram hint list as a selected logogram.

7. The method of claim 6, wherein the method further displays the selected logogram and a correction logogram hint list, each candidate logogram of the correction logogram hint list is visually similar to the selected logogram, and the method further comprising displaying a candidate logogram selection from the correction logogram hint list as a corrected selected logogram.

8. The method of claim 6, wherein the logogram input is a sub-logogram and the method further comprising:
   automatically displaying the selected logogram in response to no candidate logogram selection, wherein the selected logogram satisfies a selection policy based on the sub-logogram; and
   selecting an alternate selected logogram that satisfies the selection policy in response to a logogram rejection of a first selected logogram.

9. The method of claim 8, the method further comprising defining a logogram input area, wherein the selected logogram is within the logogram input area and the logogram rejection comprises input within the logogram input area.

10. The method of claim 9, wherein the selected logogram is retained in response to input outside the logogram input area.

11. A program product comprising a non-transitory computer readable storage medium that stores code executable by a processor, the executable code comprising code to perform:
    identifying, by use of a processor, a logogram input received from the input device, wherein the logogram input is;
    displaying a logogram hint list of candidate logograms, wherein each candidate logogram of the logogram hint list comprises the sub-logogram in response to identifying the logogram input; and
    displaying a candidate logogram selection from the hint list as a selected logogram.

12. The program product of claim 11, wherein the code further performs displaying the selected logogram and a correction logogram hint list, each candidate logogram of the correction logogram hint list is visually similar to the selected logogram, and the code further performs displaying a candidate logogram selection from the correction logogram hint list as a corrected selected logogram.

13. The program product of claim 11, wherein the logogram input is a sub-logogram and the code further performing:
    automatically displaying the selected logogram in response to no candidate logogram selection, wherein the selection logogram satisfies a selection policy based on the sub-logogram; and
    selecting an alternate selected logogram that satisfies the selection policy in response to a logogram rejection of a first selected logogram.

14. The program product of claim 13, wherein the code further performs defining a logogram input area, the selected logogram is within the logogram input area, and the logogram rejection comprises input within the logogram input area.

15. The program product of claim 14, wherein the selected logogram is retained in response to input outside the logogram input area.

* * * * *